(12) United States Patent
Syamoto (10) Patent No.: US 6,848,331 B2
(45) Date of Patent: Feb. 1, 2005

(54) SHIFT LOCK DEVICE

(75) Inventor: Noriyasu Syamoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 262 days.

(21) Appl. No.: 10/306,688

(22) Filed: Nov. 27, 2002

(65) Prior Publication Data

US 2003/0098218 A1 May 29, 2003

(30) Foreign Application Priority Data

Nov. 27, 2001 (JP) ........................................ 2001-361301

(51) Int. Cl.[7] ............................................. F16H 59/10
(52) U.S. Cl. ............................... 74/473.23; 74/473.18; 74/473.33
(58) Field of Search ........................ 74/473.18, 473.21, 74/473.22, 473.23, 473.28, 473.3, 473.33

(56) References Cited

U.S. PATENT DOCUMENTS

| | | | | |
|---|---|---|---|---|
| 1,250,355 A | * | 12/1917 | Robinson ................. | 74/473.22 |
| 3,292,450 A | * | 12/1966 | Hurst et al. ............... | 74/473.18 |
| 3,626,780 A | * | 12/1971 | Lowder et al. ........... | 74/473.21 |
| 4,297,914 A | * | 11/1981 | Klem et al. ............... | 74/532 |
| 4,546,665 A | * | 10/1985 | Bieber ...................... | 74/473.33 |
| 4,633,728 A | * | 1/1987 | May ......................... | 74/473.28 |
| 5,224,395 A | * | 7/1993 | Haight ..................... | 74/473.28 |

FOREIGN PATENT DOCUMENTS

| | | |
|---|---|---|
| DE | 19818866 | 11/1999 |
| DE | 19933320 | 2/2001 |
| DE | 10051381 | 5/2001 |
| DE | 10063604 | 7/2001 |

* cited by examiner

*Primary Examiner*—William C. Joyce
(74) *Attorney, Agent, or Firm*—Sheridan Ross PC (57) ABSTRACT

A shift lock apparatus has a shift lever operated selectively in a first and second directions to switch a gear of a vehicle. The change gear is operated based the manual operation of the lever shifted in the first direction. The gear is automatically operated when the lever is shifted in the second direction. A lock member is rotatably supported around an axis extending perpendicular to a plane including lines each extending in the first direction and in the second direction. A plurality of regulating portions are disposed in said lock member. The regulating portion is capable of regulating the shift lever that moves in the first and the second directions.

15 Claims, 4 Drawing Sheets

SHIFT LOCK DEVICE

BACKGROUND OF THE INVENTION

The present invention relates to a shift lock device and, more specifically, to a shift lock device suitable for a shift-by-wire type shift apparatus that is equipped with a shift lever.

A shift-by-wire type shift device that electrically controls the shifting of shift ranges in a vehicle transmission is known. The conventional shift device detects the operation of the shift lever by a sensor and generates an electrical detection signal. The shift device operates the actuator in accordance with the detection signal to shift the range of the transmission. In shift-by-wire type shift apparatus, a mechanical link structure for transmitting the operation of the shift lever to the transmission is not necessary. Thus, the size of the shift apparatus is easily reduced. Therefore, the shift lever is shifted with a relatively small force and the freedom in laying out the shift apparatus in the passenger compartment is increased.

Some of the shift-by-wire type shift apparatus has no parking range (P) as a shift selection. In such shift apparatus, the ignition switch is turned off while the shift lever is at a reverse (R) range or a forward range.

When parking a vehicle that has the shift apparatus, the shift lever is operated to an appropriate shift range in accordance with the condition of the vehicle, such as when parking the vehicle on a slope. For example, when parking the vehicle on an ascending slope, the shift lever is operated to the forward range to prevent the vehicle from moving backward and descending the slope. Also, for example, when parking the vehicle on a descending slope, the shift lever is operated to the reverse range (R) to prevent the vehicle from advancing and descending the slope.

As described above, the shift lever is operated to the appropriate shift range in accordance with the condition of the vehicle and locked at the selected shift range to park the vehicle.

A lock device may include solenoids in association with the shift ranges of the shift lever. A plunger of each solenoid may be formed to project to block a shift gate thereby locking the shift lever.

However, providing a solenoid to each of the shift ranges increases the number of the solenoids, causing eventually the increase of the manufacturing cost. Furthermore, a growth of the number of the solenoids results in a large space for arranging the solenoids. This hinders the size reduction of the shift apparatus.

SUMMARY OF THE INVENTION

Accordingly, it is an objective of the present invention to provide a shift lock device that is reduced in size. In association with this objective, the present invention minimizes the number of components and locks a shift lever at each of shift ranges.

To achieve the above objective, an improved shift lock apparatus is provided. The apparatus has a shift lever that is operated selectively in a first direction and a second direction to switch a change gear of a vehicle, wherein said change gear is operated based the manual operation of the lever that is shifted in the first direction and wherein said change gear is automatically operated when the lever is shifted in the second direction. The apparatus further has a lock member rotatably supported around an axis extending perpendicular to a plane including lines each extending in the first direction and in the second direction; and a plurality of regulating portions disposed in said lock member, each of said regulating portions includes at least a first regulating portion and a second regulating portion. The first regulating portion is capable of regulating the shift lever that moves in the first direction and the second regulating portion is capable of regulating the shift lever that moves in the second direction. The lock member rotates between a locking position and an unlocking position, wherein the shift lever is locked by the regulating portion in the locking position, and wherein the shift lever is unlocked in the unlocking position.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A shift lock device 81 according to the present invention will now be described with reference to FIGS. 1 to 4.

Figure 2:
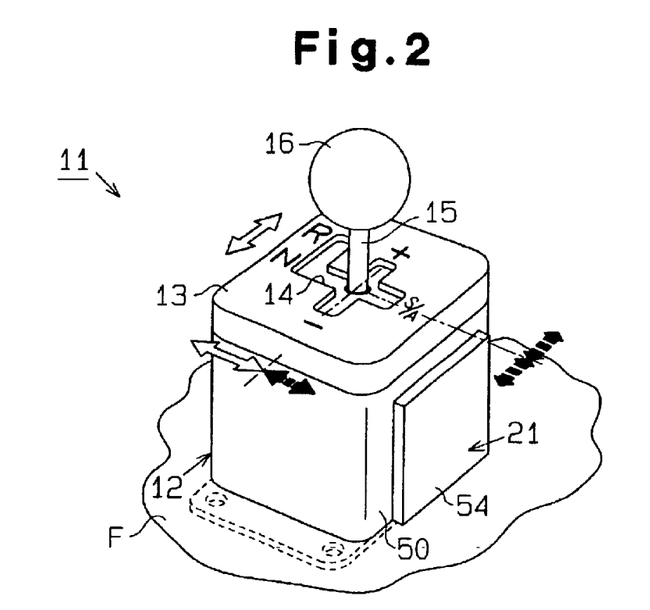
FIG. 2 is a schematic perspective view illustrating the shift apparatus.

As shown in FIG. 2, the shift apparatus 11 includes a box-like case, serving as a base housing 12 in the embodiment. The base housing 12 is secured to a floor console F of a vehicle by a flange formed at the lower end of the base housing 12.

A cover plate 13 is located on the top of the base housing 12. A shift gate 14 is formed in the cover plate 13. A shift lever 15 extends upward through the shift gate 14. A spherical shift knob 16 is attached to the distal end of the shift lever 15.

A sensor unit 21 is attached to the base housing 12.

The shift gate 14 has a cruciform and extends in the lengthwise and widthwise directions in respect with the vehicle. An additional gate further extends forward from the left end of the cruciform gate. When the shift knob 16 is operated and the shift lever 15 is shifted to the front left end (R range) of the shift gate 14, a change gear of the vehicle is shifted to a reverse range (R). When the lever 15 is operated toward the left end of the cruciform (N range), the change gear is shifted to a neutral range (N). The N range corresponds to the neutral position of the lever 15. When the lever 15 is operated toward the center of the cruciform (S range), the change gear is shifted to a sequential mode S.

When the shift lever 15 is shifted toward the front end (positive range) of the cruciform in the sequential mode S, the gear is shifted up. When a driver releases the shift knob 16, the shift lever 15 returns to the S range. When the lever 15 is shifted to the rear end (negative range) of the cruciform, the change gear is shifted down, and then the shift lever 15 returns to the S range. When the shift lever 15 is operated to the right end (S/A range) of the cruciform in the sequential mode S, the change gear is shifted to an automatic mode A. Then, although the shift lever 15 returns to the S range, the change gear is maintained in the automatic mode A. When the lever 15 is operated to the S/A range in the automatic mode A, the change gear is shifted to the sequential mode S. The vehicle travels forward in the sequential mode S and the automatic mode A. The S range corresponds to the forward range.

The shift apparatus 11 includes a stationary operation mode, in which the lever 15 is maintained at the selected range when the shift knob 16 is released, and a momentary operation mode, in which the shift lever 15 returns to a reference range when the shift knob 16 is released. The shift apparatus 11 is designed to be in the stationary operation mode when the shift lever 15 is operated among the R, N, and S ranges so that the shift lever 15 is maintained at the selected position when the driver releases the shift knob 16. The shift apparatus 11 is designed to be in the momentary operation mode when the shift lever 15 is operated among the S range, the positive range, the negative range, and the S/A range so that the shift lever 15 returns to the reference range, which is the S range, when the driver releases the shift knob 16. In FIG. 2, the section where the shift lever 15 is operated in the stationary operation mode is indicated by a white arrow and the section where the shift lever 15 is operated in the momentary operation mode is indicated by a black arrow.

In the preferred embodiment, the lever shifted between the R range and the N range is switched to a first direction, or a shift direction along a length of the vehicle. The lever switched between the positive range and the negative range is operated in the shift direction. The lever shifted between the N range and the S/A range is switched in a second direction, or a select direction along a width of the vehicle. Indications R, N, +, −, and S/A are each marked on the cover plate 13 corresponding to the R, N, +, −, and S/A ranges, respectively.

Figures 1A, 1B:
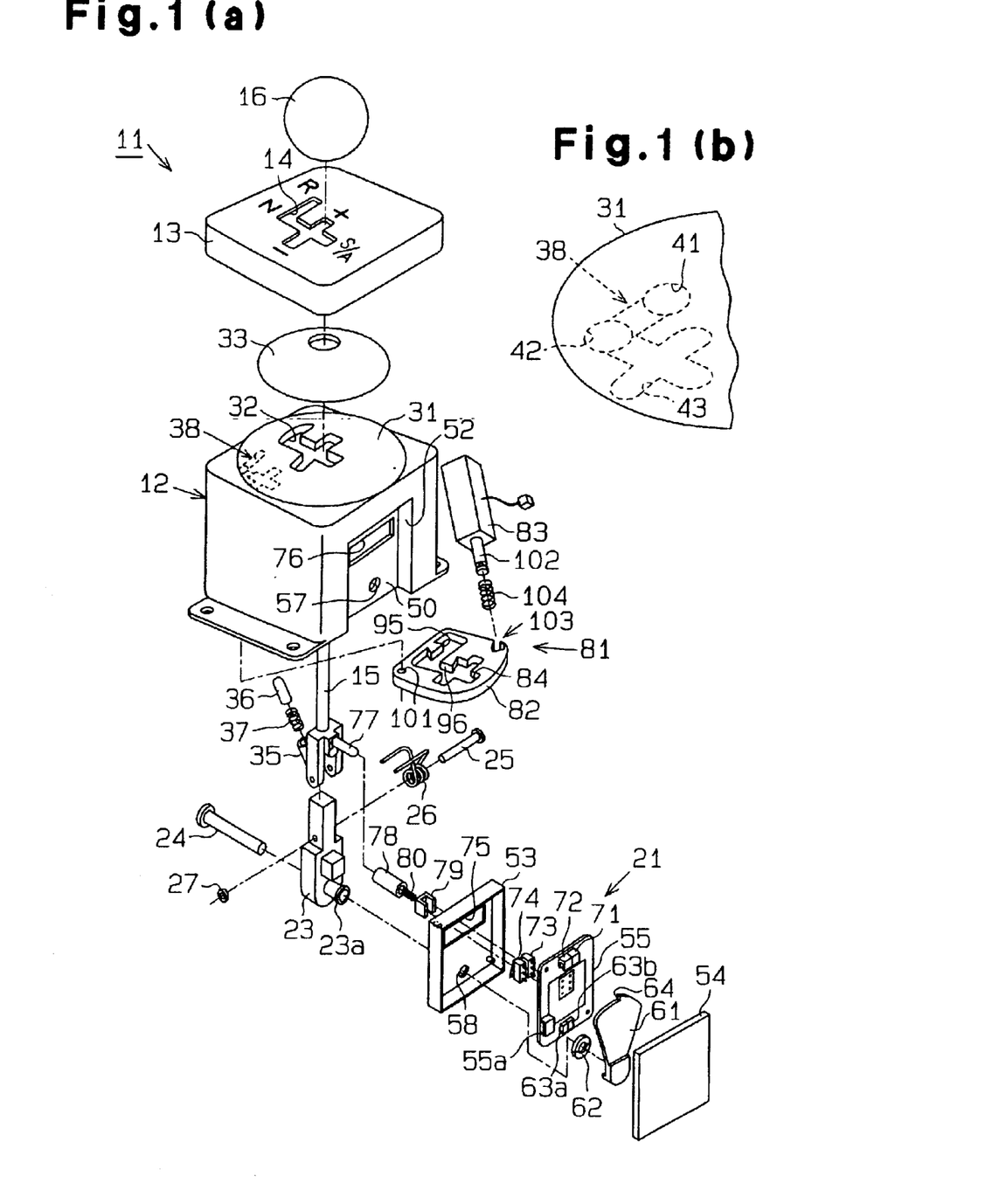
FIG. 1(a) is a schematic exploded perspective view illustrating a shift apparatus of a first embodiment of the present invention.
FIG. 1(b) is an enlarged partial schematic view illustrating a detent.

As shown in FIG. 1(*a*), a retainer 23 is located in the interior of the base housing 12. A shaft 24 is inserted through the lower portion of the retainer 23. The shaft 24 is rotatably supported by a support portion (not shown) in the base housing 12. The retainer 23 rotates integrally with the shaft 24. The shaft 24 extends from the left side to the right side. The retainer 23 and the shaft 24 are rotatable in the shift direction.

The lower portion of the shift lever 15 is rotatably supported by the upper portion of the retainer 23 with a selector pin 25. The selector pin 25 extends from the front to rear of the vehicle. The lower portion of the shift lever 15 is branched, and the upper portion of the retainer 23 is inserted between the branched portions. The selector pin 25 is inserted through a torsion spring 26, the lower portion of the shift lever 15, and the upper portion of the retainer 23. The selector pin 25 is prevented from falling out by a snap ring 27.

The shift lever 15 is rotatable in the select direction with respect to the retainer 23. Since the retainer 23 is rotatable in the shift direction and the shift lever 15 is rotatable in the select direction, the shift lever 15 is rotatable in the shift and select directions.

The upper portion of the base housing 12 includes a dome 31. A gate 32, which has the same shape as the shift gate 14 of the cover plate 13, is formed in the dome 31. Above the dome 31 is located a slide cover 33 shaped in conformity with the dome 31. The slide cover 33 slides with respect to the dome 31. The diameter of the slide cover 33 is less than that of the dome 31 and a through hole is formed at the center of the slide cover 33. The shift lever 15 is inserted through the through hole. The slide cover 33 is accommodated between the base housing 12 and the cover plate 13. The shift lever 15 extends through the gate 32, the through hole of the slide cover 33, and the shift gate 14 of the cover plate 13 in this order, and is exposed above the shift gate 14. The shift knob 16 is located at the distal end of the shift lever 15. The slide cover 33 slides with respect to the dome 31 as the shift lever 15 is moved so that the gate 32 is always covered.

A pin socket 35 extends diagonally upward from the lower portion of the shift lever 15. The pin socket 35 accommodates a detent pin 36 and a spring 37, which urges the detent pin 36 upward. A detent groove 38 is formed on the lower surface of the dome 31 to face the detent pin 36.

The detent groove 38 has the same shape as the shift gate 14. As shown in FIG. 1(*b*), the detent groove 38 includes a first recess 41, with which the detent pin 36 is fitted when the shift lever 15 is at the R range, a second recess 42, with which the detent pin 36 is fitted when the shift lever 15 is at the N range, and a substantially lateral T-shaped third recess 43, with which the detent pin 36 is fitted when the shift lever 15 is in the momentary operation mode. The passages between the first and second recesses 41, 42, and between the second and third recesses 42, 43 are shallower than the first to third recesses 41, 42, and 43. The portion of the third recess 43 that faces the detent pin 36 when the shift lever 15 is at the S range is deeper than the other portion.

Therefore, the detent pin 36 selectively engages with the first to third recesses 41, 42, and 43 when the shift lever 15 is operated among the R, N, and S ranges. This forms the stationary operation mode in which the shift lever 15 is maintained at the selected shift range although the driver releases the shift knob 16. Also, the above structure forms the momentary operation mode in which the shift lever 15 returns to the S range when the driver releases the shift knob 16 after manipulating the shift lever 15 among the S range, the positive range, the negative range, and the S/A range. The shift lever 15 returns to the S range from the S/A range by the force of the torsion spring 26.

As shown in FIGS. 1(*a*) and 2, the sensor unit 21 is attached to a right side wall 50 of the base housing 12, which is perpendicular to the shaft 24. The sensor unit 21 is formed into a flat rectangular box-like shape. As shown in FIG. 1(*a*), a mounting recess 52 is defined in the right side wall 50 of the base housing 12 for attaching the sensor unit 21. When the sensor unit 21 is attached to the base housing 12, part of the sensor unit 21 is accommodated in the mounting recess 52.

Figure 3:
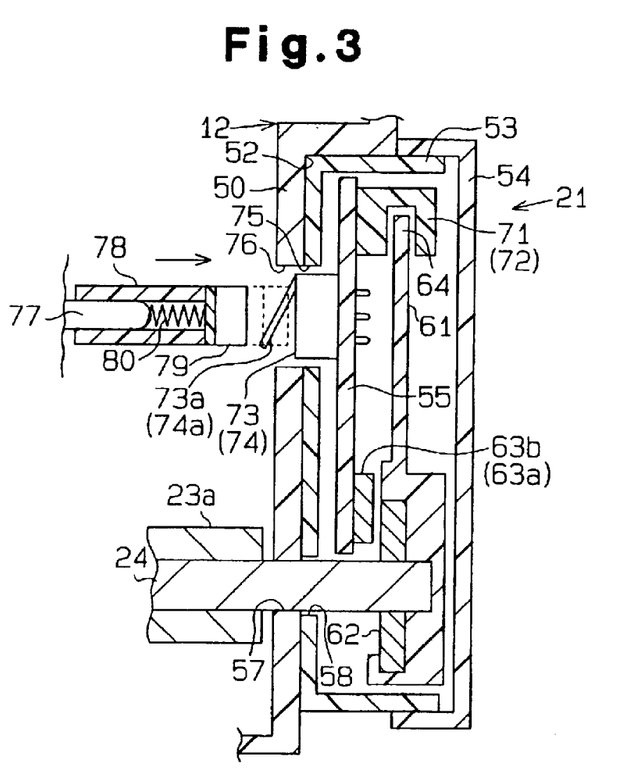
FIG. 3 is a schematic cross-sectional view illustrating a sensor unit.

FIG. 3 is a schematic cross-sectional view illustrating the sensor unit 21.

As shown in FIGS. 1(*a*) and 3, the sensor unit 21 includes a flat rectangular box-like case 53 and a cover plate 54, which covers the case 53. The case 53 is accommodated in the mounting recess 52.

A PC board 55 is accommodated in the case 53 and is secured to the case 53. The PC board 55 is shorter than the case 53 in the vertical direction and arranged at the upper portion of the case 53. Thus, the PC board 55 does not directly face the lower portion of the case 53.

A connector 55a is attached to the edge of the PC board 55.

A through hole 57 is formed at the lower portion of the right side wall 50 of the base housing 12, and another through hole 58 is formed at the lower portion of the case 53. The shaft 24 is inserted through the through holes 57, 58. The distal end of the shaft 24 is located inside the sensor unit 21. The distal end of the shaft 24 is located closer to the cover plate 54 than the PC board 55. The retainer 23 has a cylinder 23a for supporting the shaft 24, which extends toward the right side wall 50.

A fan-shaped plate 61 is attached to the distal end of the shaft 24. An annular magnet 62 is attached to the lower end of the plate 61. The shaft 24 is inserted through the magnet 62. The plate 61 and the magnet 62 rotate integrally with the shaft 24. The magnet 62 is polarized such that the polarity changes in the circumferential direction.

A first magnetoresistance element (MRE) 63a and a second magnetoresistance element (MRE) 63b are attached to the lower portion of the PC board 55 to face the upper portion of the magnet 62. The first and the second MREs 63a, 63b are arranged in the lengthwise direction of the vehicle. The first MRE 63a is located on the rear side and the second MRE 63b is located on the front side. The first and second MREs 63a, 63b detect the magnetic flux of the magnet 62, which rotates integrally with the shaft 24.

The first and second MREs 63a, 63b detect three kinds of analog output signals based on variation of the magnetic flux of the magnet 62, which rotates integrally with the shift lever 15. In the preferred embodiment, when the shift lever 15 is located at either the R range or the positive range, the first and second MREs 63a, 63b detect a signal V1. Also, when the shift lever 15 is located at any of the N range, the S range, and the S/A range, the first and second MREs 63a, 63b detect a signal V2. When the shift lever 15 is located at the negative range, the first and second MREs 63a, 63b detect a signal V3. As described above, the magnet 62 and the first and second MREs 63a, 63b detect changes in the shift direction of the shift lever 15.

A projecting piece 64 is formed at the upper portion of the plate 61. In the preferred embodiment, the projecting piece 64 is formed at the front side of the plate 61.

A first photo interrupter 71 and a second photo interrupter 72 are located at the upper portion of the PC board 55 to face the plate 61. The first and the second photo interrupters 71, 72 have substantially U-shaped cross-sections. A luminous element and a photodetector are placed on each of the first and the second photo interrupters 71, 72 so that each set of the luminous element and the photodetector face each other. When the plate 61 is rotated, the projecting piece 64 selectively blocks light between the luminous element and the photodetector of each of the first and the second photo interrupters 71, 72. The first and the second photo interrupters 71, 72 are arranged in the lengthwise direction of the vehicle. The first photo interrupter 71 is located on the front side and the second photo interrupter 72 is located on the rear side.

The plate 61, the magnet 62, the first and second MREs 63a, 63b, the projecting piece 64, the first and second photo interrupters 71, 72 form a first sensing mechanism.

In the preferred embodiment, when the shift lever 15 is located at either the R range or the positive range, the first and second photo interrupters 71, 72 receive light. When the shift lever 15 is located at any of the N range, the S range, or the S/A range, the projecting piece 64, which rotates integrally with the shift lever 15, blocks the light of the first photo interrupter 71. At this time, the second photo interrupter 72 keeps receiving light. When the shift lever 15 is at the negative range, the first and second photo interrupters 71, 72 are both blocked by the projecting piece 64. Therefore, variation of the shift direction of the shift lever 15 is also detected by digital output signals generated by the first and second photo interrupters 71, 72 and the projecting piece 64.

As described above, variation of the shift direction of the shift lever 15 is detected by two methods, which are a method using analog output signals generated by the combination of the magnet 62 and the first and second MREs 63a, 63b, and a method using digital output signals generated by the combination of the first and second photo interrupters 71, 72 and the projecting piece 64. Signals from the first and second MREs 63a, 63b and signals from the first and second photo interrupters 71, 72 are processed by an OR circuit and sent to an electronic control unit (ECU), which controls shifting of the gear range. Therefore, although either the first and second MREs 63a, 63b or the first and the second photo interrupters 71, 72 fail, variation of the shift direction of the shift lever 15 is detected by the other one.

A first micro switch 73 and a second micro switch 74 are located at the substantial center of the PC board 55 on the surface facing the shift lever 15. The first and the second micro switches 73, 74 are arranged in the lengthwise direction of the vehicle. The first micro switch 73 is located on the front side and the second micro switch 74 is located on the rear side. Levers 73a, 74a are attached to the first and the second micro switches 73, 74, respectively, at an angle. The first and second micro switches 73, 74 send different signals when the levers 73a, 74a are half-way pressed from when the levers 73a, 74a are fully pressed. The first and second micro switches 73, 74 form a second sensing mechanism.

A substantially rectangular through hole 75 is formed in the case 53 at a position facing the first and second micro switches 73, 74. Another substantially rectangular through hole 76 is formed in the right side wall 50 of the base housing 12 at a position facing the first and second micro switches 73, 74. The size of the through holes 75, 76 are greater than the total size of the first and second micro switches 73, 74. The first and second micro switches 73, 74 project from the through hole 75 of the cover case 53. Parts of the levers 73a, 74a project from the through hole 76 of the right side wall 50.

A projection 77 is formed on the shift lever 15 and extends toward the first and second micro switches 73, 74.

The distal end of the projection 77 is covered by a cylinder 78. A substantially U-shaped contact portion 79 is attached to the distal end of the cylinder 78. The contact portion 79 faces the first and second micro switches 73, 74 and operates the first and second micro switches 73, 74. The cylinder 78 accommodates a spring 80 between the distal end of the projection 77 and the contact portion 79.

When the shift lever 15 is at the S range, the levers 73a, 74a of the first and second micro switches 73, 74 are half-way pressed by the contact portion 79. When the shift lever 15 is at the S/A range, the levers 73a, 74a are fully pressed by the contact portion 79. The contact portion 79 does not contact the levers 73a, 74a when the shift lever 15 is located at any position other than the S range, the S/A range, or between the S range and the S/A range. That is, the contact portion 79 does not contact the levers 73a, 74a when the shift lever 15 is located at the N range. As described above, variation of the select direction of the shift lever 15 is detected by the first and second micro switches 73, 74 and the contact portion 79.

The ECU determines the position of the shift lever 15 in the shift direction and the select direction in accordance with the detection signals and sends a predetermined operation signal to an actuator, which shifts the gear of the vehicle based on the position of the shift lever 15.

The spring 80 absorbs shock generated when the contact portion 79 presses the levers 73a, 74a. The spring 80 also absorbs over stroke such that the contact portion 79 does not apply excessive load to the first and second micro switches 73, 74 when the shift lever 15 is at the S/A range.

As shown in FIG. 1(a), a shift lock device 81 is located below the dome 31 inside the base housing 12.

Figure 4A:
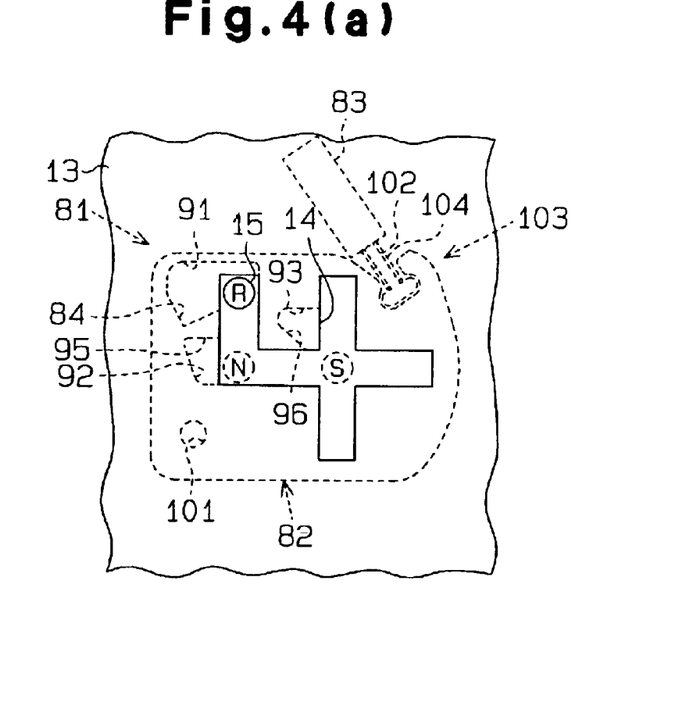
FIG. 4(a) is a schematic partial plan view illustrating the shift lever in a released state.
Figure 4B:
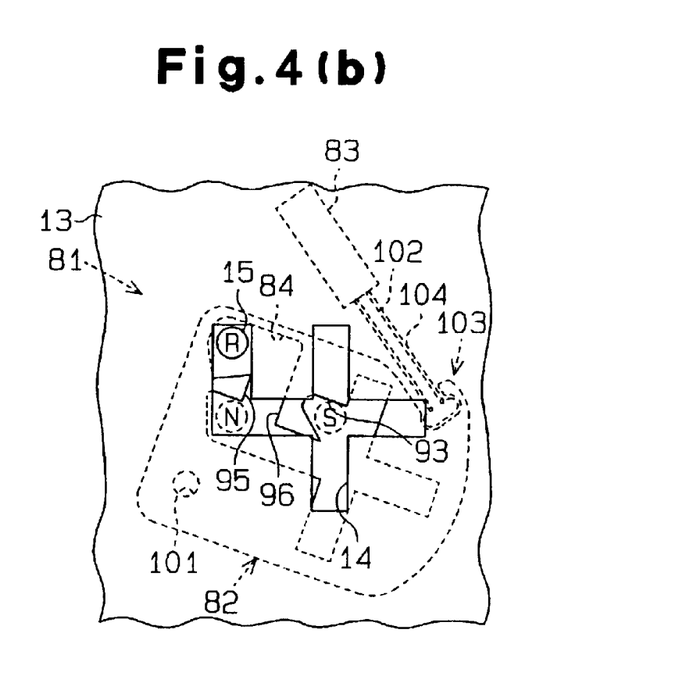
FIG. 4(b) is a schematic partial plan view illustrating the shift lever in a locked state.

FIG. 4(a) is a schematic partial plan view illustrating the shift lever 15 in a released state. FIG. 4(b) is a schematic partial plan view illustrating the shift lever 15 in a locked state.

The shift lock device 81 includes a lock member, which is a stopper plate 82, and a suction solenoid 83. A groove 84 having a shape corresponding to the shift gate 14 is formed on the stopper plate 82. The shift lever 15 extends through the groove 84. The stopper plate 82 is in a released position in FIG. 4(a) and is in a locked position in FIG. 4(b).

As shown in FIG. 4(a), in addition to the shape corresponding to the shift gate 14, the groove 84 has a first recess 91, which extends leftward from the position corresponding to the R range. The groove 84 further has a second recess 92, which extends leftward from the position corresponding to the N range, and a third recess 93, which extends diagonally forward left from the position corresponding to the S range. Therefore, a portion of the stopper plate 82 between the first recess 91 and the second recess 92 serves as a first restrictor 95, which extends toward a passage between the R range and the N range. Also, a portion of the stopper plate 82 between the third recess 93 and the R range serves as a second restrictor 96, which extends toward a passage between the N range and the S range.

A bore 101, which extends vertically, is formed at the corner of the stopper plate 82 that is at the rear of the second recess 92. A shaft (not shown), which extends vertically inside the base housing 12, is inserted through the bore 101. The base plate 82 is rotatably supported by the shaft at the upper portion of the base housing 12.

An engaging portion 103, which engages with a plunger 102 of the suction solenoid 83, is formed at the corner diagonally opposite to the corner at which the bore 101 is formed. The plunger 102 is inserted through a spring 104 and is engaged with the engaging portion 103 at the distal end. The plunger 102 extends in a direction that is the same as the tangential direction of the rotation of the stopper plate 82 such that the stopper plate 82 is rotatable by the suction solenoid 83. The engaging portion 103 is formed to surround the distal end of the plunger 102 such that the engaging portion 103 is always engaged with the distal end of the plunger 102 although the angle between the plunger 102 and the engaging portion 103 changes by the rotation of the groove 84.

When the ignition switch of the vehicle is on, current is supplied to the suction solenoid 83. Thus, as shown in FIG. 4(a), the plunger 102 is retracted and the shift gate 14 is not blocked by the stopper plate 82. As a result, the shift lever 15 is in the released state.

When the ignition switch of the vehicle is off, no current is supplied to the suction solenoid 83. Thus, the stopper plate 82 is rotated clockwise about the bore 101 by the spring 104 as shown in FIG. 4(a). When the stopper plate 82 is rotated, the first restrictor 95 blocks the shift gate 14 between the R range and the N range, and the second restrictor 96 blocks the shift gate between the N range and the S range as shown in FIG. 4(b). The R range of the shift gate 14 overlaps with the first recess 91 of the groove 84. The N range of the shift gate 14 overlaps with the second recess 92 of the groove 84. The S range of the shift gate 14 overlaps with the third recess 93 of the groove 84. If the ignition switch of the vehicle is turned off when the shift lever 15 is at any of the R range, the S range, or the N range, the stopper plate 82 is rotated and the shift lever 15 is locked.

The first restrictor 95 has inclined side surfaces. When the stopper plate 82 is in the locked position, the shift lever 15 engages with the first restrictor 95. Although the shift lever 15 is urged from the N range to the R range or from the R range to the N range, the stopper plate 82 is urged in a direction opposite to the released position. Therefore, the shift lever 15 is prevented from being unlocked.

The second restrictor 96 also has inclined side surfaces. When the stopper plate 82 is in the locked position, the shift lever 15 engages with the second restrictor 96. Although the shift lever 15 is urged from the N range to the S range or from the S range to the N range, the stopper plate 82 is urged in a direction opposite to the released position. Therefore, the shift lever 15 is prevented from being unlocked.

The operations of the shift lock device 81, which is constructed as above, will hereafter be described.

When the ignition switch is on, current is supplied to the suction solenoid 83 and the plunger 102 is retracted against the force of the spring 104 as shown in FIG. 4(a). Therefore, the shift lever 15 is in the released state.

If the ignition switch of the vehicle is turned off when the shift lever 15 is at the R range, current supply to the suction solenoid 83 is stopped. Thus, the stopper plate 82 is rotated clockwise about the bore 101 by the force of the spring 104. Therefore, as shown in FIG. 4(b), the first restrictor 95 blocks the shift gate 14 between the R range and the N range, which locks the shift lever 15 at the R range. The R range of the shift gate 14 overlaps the first recess 91 of the groove 84. Therefore, the shift lever 15 is accommodated in the first recess 91. This permits the stopper plate 82 to rotate smoothly.

If the ignition switch of the vehicle is turned on when the shift lever 15 is locked at the R range, current is supplied to the suction solenoid 83. Thus, the plunger 102 is retracted against the force of the spring 104, and the stopper plate 82 is rotated counterclockwise about the bore 101. Therefore, the first restrictor 95 moves leftward as shown in FIG. 4(a), and the shift gate 14 is no longer blocked. Thus, the shift lever 15 is released.

If the ignition switch is turned off when the shift lever 15 is at the S range, the stopper plate 82 is rotated clockwise by the force of the spring 104. In this case, the second restrictor 96 blocks the shift gate 14 between the N range and the S range. Thus, the shift lever 15 is locked at the S range as shown in FIG. 4(b). The S range of the shift gate 14 overlaps the third recess 93 of the groove 84. Therefore, the shift lever 15 is accommodated in the third recess 93. This permits the stopper plate 82 to rotate smoothly.

If the ignition switch is turned on when the shift lever 15 is locked at the S range, current is supplied to the solenoid 83. Thus, the stopper plate 82 is rotated counterclockwise causing the first restrictor 95 to move leftward as shown in FIG. 4(a). Therefore, the shift gate 14 is no longer blocked and the shift lever 15 is released.

If the ignition switch is turned off when the shift lever 15 is at the N range, the groove 84 is rotated clockwise causing the shift lever 15 to be locked at the N range by the first and second restrictors 95, 96.

This embodiment provides the following advantages.

(1) The stopper plate 82 has the first restrictor 95 and the second restrictor 96. In this case, the first restrictor 95 selectively blocks the shift gate 14 between the R range and the N range, and the second restrictor 96 selectively blocks the shift gate 14 between the N range and the S range when the stopper plate 82 is rotated. Therefore, the stopper plate 82 serves as a lock member for locking the shift lever 15 at any of the R range, the S range, and the N range. This reduces the number of components of the shift lock device 81.

(2) The stopper plate 82 is selectively rotated by one suction solenoid 83. In this case, the number of components is reduced as compared to a case in which a plurality of solenoids is used. Therefore, the size of the shift lock device 81 is reduced.

(3) The shape of the groove 84 corresponds to the shape of the shift gate 14. Thus, the groove 84 is relatively easily formed.

(4) The stopper plate 82 is located at the upper portion of the base housing 12. In this case, as compared to a case in which the stopper plate 82 is located at the lower portion of the base plate 12, the contact portion between the stopper plate 82 and the shift lever 15 is located apart from the rotary axis of the shift lever 15 and close to the shift knob 16 by which the driver operates. As a result, force applied to the stopper plate 82 when the shift lever 15 abuts against the stopper plate 82 is relatively smaller than in a case in which the stopper plate 82 is located in the vicinity of the rotary axis of the shift lever 15 due to the principle of leverage.

(5) The first and second restrictors 95, 96 have inclined side surfaces. Therefore, the stopper plate 82 does not receive a force in a direction to release the lock although the shift lever 15 is urged toward other shift ranges while the shift lever 15 is engaged with either the first restrictor 95 or the second restrictor 96. Accordingly, the driver is prevented from moving the shift lever 15 to other shift ranges by mistake.

It should be apparent to those skilled in the art that the present invention may be embodied in many other specific forms without departing from the spirit or scope of the invention. Particularly, it should be understood that the invention may be embodied in the following forms.

Figure 5:
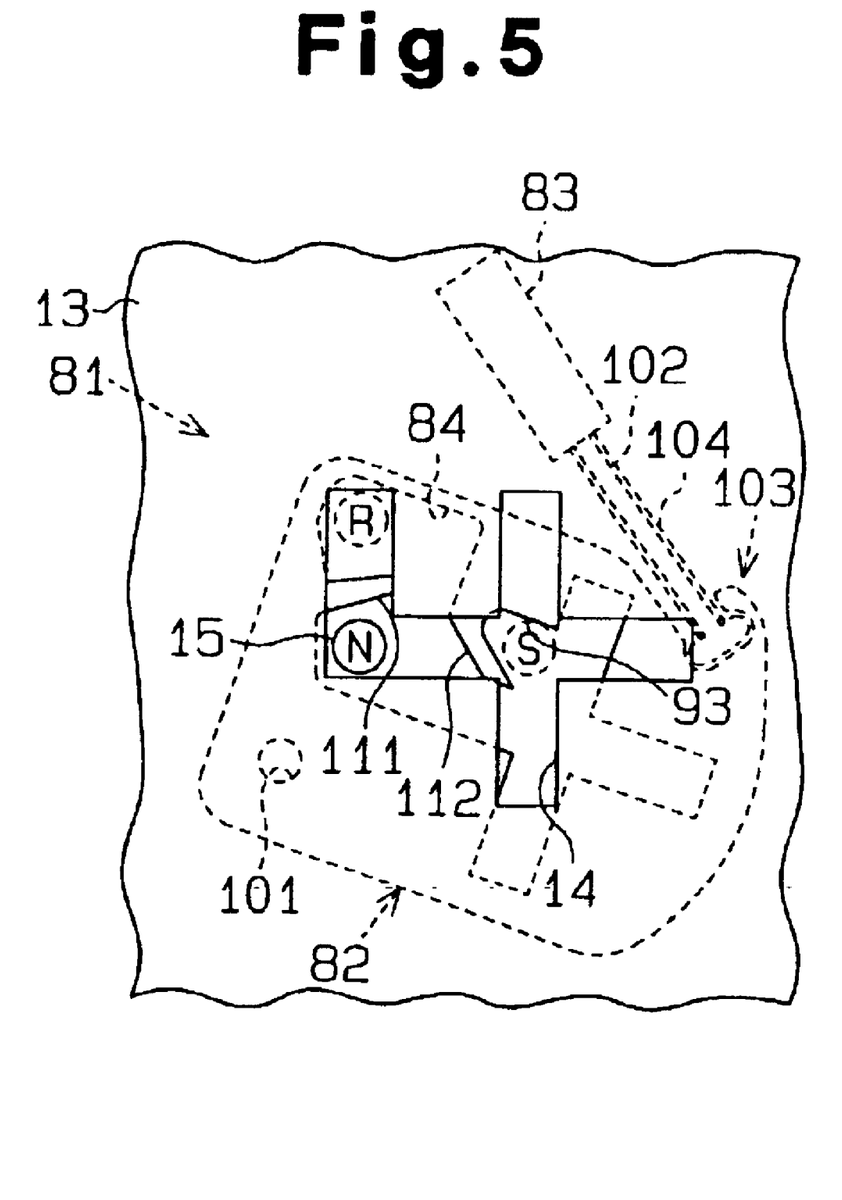
FIG. 5 is a schematic plan view illustrating a modified embodiment of the present invention.

The first and second restrictors 95, 96 need not have the above shape. For example, the first and second restrictors 95, 96 may be formed such that the shift lever 15 is movable from the N range to one of the R range and the S range when the stopper plate 82 is in the locked position. For example, the distal end of a first restrictor 95 on the side of the N range may be cut off to form a restrictor 111 as shown in FIG. 5. Thus, the distal end of the first restrictor 111 is further from the shift lever 15 located at the N range than the proximal end when the stopper plate 82 is in the locked position. In the same manner, the distal end of the second restrictor 96 on the side of the N range may be cut off to form a second restrictor 112 as shown in FIG. 5. Thus, the distal end of the second restrictor 112 is further from the shift lever 15 located at the N range than the proximal end when the stopper plate 82 is in the locked position.

In this case, when the shift lever 15 at the N range is urged toward the R range and abuts against the first restrictor 111, the stopper plate 82 is rotated toward the released position. The first restrictor 111 is then pressed out of the shift gate 14 and the shift lever 15 moves to the R range. After the shift lever 15 is shifted to the R range, the stopper plate 82 is rotated toward the locked position again by the force of the spring 104. Thus, the first restrictor 111 blocks the shift gate 14 between the R range and the N range to lock the shift lever 15 at the R range.

In the same manner, when the shift lever 15 at the N range is urged toward the S range and abuts against the second restrictor 112, the stopper plate 82 is rotated toward the released position. The second restrictor 112 is then pressed out of the shift gate 14 and the shift lever 15 moves to the S range. After that, the second restrictor 112 blocks the shift gate 14 between the S range and the N range again to lock the shift lever 15 at the S range.

In this case, if the ignition switch is turned off when the shift lever 15 is at the N range when parking the vehicle on a slope, the shift lever 15 can be shifted to and locked at the R range or the S range while the ignition switch is kept off. For example, when parking the vehicle on a descending slope, to prevent the vehicle from advancing and descending the slope, the shift lever 15 is shifted from the N range to the R range and locked at the R range. When parking the vehicle on an ascending slope, to prevent the vehicle from moving backward and descending the slope, the shift lever 15 is shifted from the N range to the S range and locked at the S range.

The stopper plate need not have both the first and second restrictors. For example, a plurality of first restrictors may be formed and the second restrictor may be omitted.

For example, a parking (P) range may be formed in front of the R range so that the P range, the R range, and the N range are arranged along a straight line in the lengthwise direction (first direction). In this case, the stopper plate may have two first restrictors by forming another first restrictor that restricts the movement of the shift lever 15 between the P range and the R range in addition to the first restrictor 95, which restricts the movement of the shift lever 15 between the R range and the N range.

The stopper plate need not have both the first and second restrictors. For example, a plurality of second restrictors may be formed and the first restrictor may be omitted.

For example, a parking (P) range may be formed on the left side of the N range so that the P range, the N range, and the S range are arranged along a straight line in the widthwise direction (second direction). In this case, the stopper plate may have two second restrictors by forming another second restrictor that restricts the movement of the shift lever 15 between the P range and the N range in addition to the second restrictor 96, which restricts the movement of the shift lever 15 between the N range and the S range.

The stopper plate 82 need not be rotated by the suction solenoid 83. For example, the stopper plate 82 may be rotated manually. For example, holes may be formed in the cover plate 13 and the dome 31. The driver may put his/her finger through the holes and rotate the stopper plate 82 by the finger to lock or release the shift lever 15.

In this case, to restrict rotation of the stopper plate 82 at each of the locked position and the released position, a pin, which moves vertically, is located on the stopper plate 82 and recesses are formed on a different plate at positions corresponding to the locked position and the released position. The pin selectively engages with one of the recesses. The pin is inserted in one of the recesses by the finger to restrict the stopper plate 82 at the locked position or the released position. The pin is disengaged from the recess to permit the stopper plate 82 to rotate.

In this case, electric wiring may be omitted from the shift lock device 81.

The solenoid need not be the suction solenoid, which retracts the plunger when excited. For example, the solenoid may extend the plunger when excited. The side surfaces of the first and second restrictors 95, 96 need not be formed at an angle as long as the stopper plate 82 does not receive forces in a direction to release the lock although the shift lever 15 is urged toward other shift ranges while the stopper plate 82 is at the locked position and the shift lever 15 is engaged with either of the first or second restrictor 95 or 96. For example, the side surfaces of the first and second restrictors 95, 96 may be curved to a degree that does not hinder the function of the first and second restrictors 95, 96.

The shape of the shift gate 14 may be modified to other shape. In this case, the shape of the groove 84, the first restrictor 95, and the second restrictor 96 are changed corresponding to the modified shift gate 14.

The groove 84 need not have the shape corresponding to the shift gate 14. For example, the groove 84 may be an elliptical hole. In this case, the first and second restrictors 95, 96 extend inward of the ellipse.

The lock member need not be formed as the stopper plate 82. For example, the portion other than the first restrictor 95 and the second restrictor 96 may be omitted. In this case, the size of the shift lock device 81 and the shift apparatus 11 is further reduced.

The number of the restrictors formed on the stopper plate 82 need not be two. For example three or more restrictors may be formed. For example, two first restrictors and one second restrictor may be formed.

The stopper plate 82 need not have a plurality of restrictors. The stopper plate 82 may have only one restrictor. For example, the stopper plate 82 may have only one first restrictor and the second restrictor may be omitted. For example, the stopper plate may have only one second restrictor and the first restrictor may be omitted.

The number of MREs for detecting the magnetic flux of the magnet 62 need not be two, which includes, for example, the first and second MREs 63a, 63b. For example, three or more MREs may be provided or only one MRE may be provided.

The first and second MREs 63a, 63b need not be attached to face the magnet 62. For example, Hall element may be attached to face the magnet 62.

The shift apparatus 11 need not be located on the floor console F. For example, the shift apparatus 11 may be located on an instrument panel or column, on which the steering shaft is located. The shift apparatus 11 may be located on a door.

A sensor for detecting the operation of the shift lever 15 need not be formed as the sensor unit 21. For example, a sensor may be located at each shift range of the shift lever 15.

The shaft 24 need not extend in the widthwise direction and the selector pin 25 need not extend in the lengthwise direction. The shaft 24 may extend in the lengthwise direction and the selector pin 25 may extend in the widthwise direction. In this case, the sensor unit 21 is attached to the front surface or the rear surface of the base housing 12.

Therefore, the present examples and embodiments are to be considered as illustrative and not restrictive and the invention is not to be limited to the details given herein, but may be modified within the scope and equivalence of the appended claims.

What is claimed is:

1. A shift lock apparatus having a shift lever that is operated selectively in a first direction and a second direction to switch a change gear of a vehicle, wherein said change gear is operated based upon the manual operation of the lever that is shifted in the first direction and wherein said change gear is automatically operated when the lever is shifted in the second direction, said apparatus comprising:

a lock member rotatably supported around an axis extending perpendicular to a plane including lines each extending in the first direction and in the second direction; and a plurality of regulating portions disposed in said lock member, each of said regulating portions includes at least a first regulating portion and a second regulating portion, wherein said first regulating portion is capable of regulating the shift lever movement in the first direction and wherein said second regulating portion is capable of regulating the shift lever movement in the second direction;

wherein the first shift direction is substantially perpendicular to the second shift direction; and wherein said lock member rotates between a locking position and an unlocking position, wherein the shift lever is locked by the regulating portion in the locking position, and wherein the shift lever is unlocked in the unlocking position.

2. A shift lock apparatus as set forth in claim 1, wherein said lock member has a notch for allowing the shift member to move when the lock member is in the unlocking position, and wherein said notch has the first regulating portion and the second regulating position.

3. A shift lock apparatus as set forth in claim 1, wherein said shift lever is movable between a neutral position and a selected position different from the neutral position.

4. A shift lock apparatus as set forth in claim 1, wherein said shift lever abuts one of the first regulating portion and the second regulating portion when the lock member is in the locking position and the shift lever is in the neutral position, and wherein the lock member is member is moved to the unlocking position when the shift lever is urged to the selected position.

5. A shift lock apparatus as set forth in claim 1, wherein the lock member is free from a force acting toward the unlocking position resulted from the shift lever biased toward the selected position when the lock member is in the locking position and the shift lever engages the regulating portion.

6. A shift lock apparatus as set forth in claim 1, wherein said lock member includes a solenoid generating a force and a spring generating a force against the force generated by the solenoid.

7. A shift lock apparatus as set forth in claim 1, wherein said lock member is manually operated.

8. A shift lock apparatus as set forth in claim 1, wherein said lock member has either a plurality of the first regulating portions and a plurality of the second regulating portions.

9. A shift lock apparatus having a shift lever that is operated selectively in a first direction and a second direction to switch a change gear of a vehicle, wherein said change gear is operated based upon the manual operation of the lever that is shifted in the first direction and wherein said change gear is automatically operated when the lever is shifted in the second direction, said apparatus comprising:

a lock member rotatably supported around an axis extending perpendicular to a plane including lines each extending in the first direction and in the second direction; and a plurality of regulating portions disposed in said lock member, each of said regulating portions includes at least a first regulating portion and a second regulating portion, wherein said first regulating portion is capable of regulating the shift lever movement in the first direction and wherein said second regulating portion is capable of regulating the shift lever movement in the second direction, wherein said lock member rotates between a locking position and an unlocking position, wherein the shift lever is locked by the regulating portion in the locking position, wherein the shift lever is unlocked in the unlocking position and wherein said lock member has a notch for allowing the shift member to move when the lock member is in the unlocking position, and wherein said notch has the first regulating portion and the second regulating position, and wherein the first shift direction is substantially perpendicular to the second shift direction.

10. A shift lock apparatus as set forth in claim 9, wherein said shift lever is movable between a neutral position and a selected position different from the neutral position.

11. A shift lock apparatus as set forth in claim 9, wherein said shift lever abuts one of the first regulating portion and the second regulating portion when the lock member is in the locking position and the shift lever is in the neutral position, and wherein the lock member is member is moved to the unlocking position when the shift lever is urged to the selected position.

12. A shift lock apparatus as set forth in claim 9, wherein the lock member is free from a force acting toward the unlocking position resulted from the shift lever biased toward the selected position when the lock member is in the locking position and the shift lever engages the regulating portion.

13. A shift lock apparatus as set forth in claim 9, wherein said lock member includes a solenoid generating a force and a spring generating a force against the force generated by the solenoid.

14. A shift lock apparatus as set forth in claim 9, wherein said lock member is manually operated.

15. A shift lock apparatus as set forth in claim 9, wherein said lock member has either a plurality of the first regulating portions and a plurality of the second regulating portions.

* * * * *